(12) United States Patent
Zhao et al.

(10) Patent No.: US 10,254,588 B2
(45) Date of Patent: Apr. 9, 2019

(54) CURVED SURFACE LIQUID CRYSTAL DISPLAY PANEL AND DISPLAY DEVICE

(71) Applicant: BOE Technology Group Co., Ltd., Beijing (CN)

(72) Inventors: Weili Zhao, Beijing (CN); Jikai Yao, Beijing (CN); Hua Huang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/452,904

(22) Filed: Mar. 8, 2017

(65) Prior Publication Data

US 2017/0276988 A1  Sep. 28, 2017

(30) Foreign Application Priority Data

Mar. 25, 2016  (CN) .......................... 2016 1 0179898

(51) Int. Cl.
*G02F 1/13363* (2006.01)
*G02F 1/1335* (2006.01)

(52) U.S. Cl.
CPC .... *G02F 1/13363* (2013.01); *G02F 1/133528* (2013.01); *G02F 2001/133631* (2013.01);
(Continued)

(58) Field of Classification Search
CPC ........... G02F 1/13363; G02F 1/133528; G02F 2201/56; G02F 2201/133631
See application file for complete search history.

(56) References Cited

U.S. PATENT DOCUMENTS 9,983,440 B2 * 5/2018 Tanaka ................ G02F 1/13363
2003/0218709 A1  11/2003 Ito et al.
(Continued)

FOREIGN PATENT DOCUMENTS

CN  1441915 A  9/2003
CN  1790135 A  6/2006
(Continued)

OTHER PUBLICATIONS

May 2, 2018—(CN) Office Action application 201610179898.2 with English Translation.

*Primary Examiner* — Dung T Nguyen
(74) *Attorney, Agent, or Firm* — Banner & Witcoff, Ltd.

(57) ABSTRACT

A curved surface LCD panel and a display device are disclosed. The curved surface LCD panel includes an array substrate and an opposite substrate parallel with each other and curved in a same direction, wherein edge zones of the array substrate and the opposite substrate having plural optical retardation zones, each of the optical retardation zones on the array substrate being corresponding to one of the optical retardation zones on the opposite substrate, and two corresponding optical retardation zones constituting a zone group; a LC layer located between the array substrate and the opposite substrate; and an optical compensation film attached at each of the optical retardation zones in at least one zone group; wherein the optical compensation film being perpendicular to an optical axis of the optical retardation zone attached with the optical compensation film and having an equal optical retardation with the optical retardation zone.

17 Claims, 5 Drawing Sheets

(52) U.S. Cl.
CPC ...... *G02F 2201/56* (2013.01); *G02F 2413/02* (2013.01); *G02F 2413/04* (2013.01); *G02F 2413/07* (2013.01)

(56) References Cited

U.S. PATENT DOCUMENTS

| | | | |
|---|---|---|---|
| 2014/0078450 A1* | 3/2014 | Yang | .................. G02F 1/13363 349/96 |
| 2015/0277131 A1* | 10/2015 | Park | .................. G02B 27/2221 349/58 |
| 2015/0286083 A1 | 10/2015 | Kang et al. | |
| 2016/0062166 A1 | 3/2016 | Kim et al. | |
| 2016/0209692 A1* | 7/2016 | Huang | ................ G02F 1/13363 |
| 2017/0102568 A1 | 4/2017 | Zhao et al. | |

FOREIGN PATENT DOCUMENTS

| | | | |
|---|---|---|---|
| CN | 103676291 A | | 3/2014 |
| CN | 103869539 A | | 6/2014 |
| CN | 104614896 A | | 5/2015 |
| CN | 104714330 A | | 6/2015 |
| CN | 104777678 A | | 7/2015 |
| CN | 104793281 A | | 7/2015 |
| CN | 104978900 A | | 10/2015 |
| CN | 105388659 A | | 3/2016 |
| WO | WO 2016/112102 | * | 7/2016 |

\* cited by examiner

CURVED SURFACE LIQUID CRYSTAL DISPLAY PANEL AND DISPLAY DEVICE

This application claims priority to and the benefit of Chinese Patent Application No. 201610179898.2 filed on Mar. 25, 2016, which application is incorporated herein in its entirety.

TECHNICAL FIELD

Embodiments of the present invention relate to a curved surface liquid crystal display panel and a display device.

BACKGROUND

At present, curved surface liquid crystal display (LCD) panels of IPS mode and ADS mode are playing important roles in LCD technology for excellent viewing angle thereof.

Since mechanical fixing elements located at peripheral areas of a curved surface LCD panel usually are subjected to uneven forces, the panel may occur deformation (bending) during assembling; moreover, in order to achieve a curved surface of the LCD panel, a glass substrate may involve problems in connection with the force subjected during stretching and shrinking thereof, for example, a polarization characteristic of light at locations with concentrated stress may be varied due to a retardation of the glass substrate and forms an included angle with respective to an optical axis of liquid crystals (LCs), which may lead to serious dark-state light leakage.

SUMMARY

At least one embodiment of the present invention provides a curved surface LCD panel and a display device, which can depress the dark-state light leakage in the existing curved surface LCD panel.

In order to achieve the objective above, the embodiments of the present invention utilize technical solutions as below.

On one aspect, a curved surface LCD panel is provided, comprising: an array substrate and an opposite substrate being parallel with each other and being curved in a same direction, wherein edge zones of the array substrate and of the opposite substrate having a plurality of optical retardation zones, each of the optical retardation zones on the array substrate being corresponding to one of the optical retardation zones on the opposite substrate, and two corresponding optical retardation zones constituting a zone group; a liquid crystal (LC) layer located between the array substrate and the opposite substrate; and an optical compensation film attached at each of the optical retardation zones in at least one zone group on the array substrate and the opposite substrate, respectively; the optical compensation film having an optical axis perpendicular to an optical axis of the optical retardation zone attached with the optical compensation film, and having an optical retardation equal with an optical retardation of the optical retardation zone attached with the optical compensation film.

One the other aspect, a display device is provided, comprising the above-mentioned curved surface LCD panel.

BRIEF DESCRIPTION OF THE DRAWINGS

Hereafter, the embodiments of the present invention will be described in detail with reference to the drawings, so as to make one person skilled in the art understand the present invention more clearly.

DETAILED DESCRIPTION

Figure 1A:
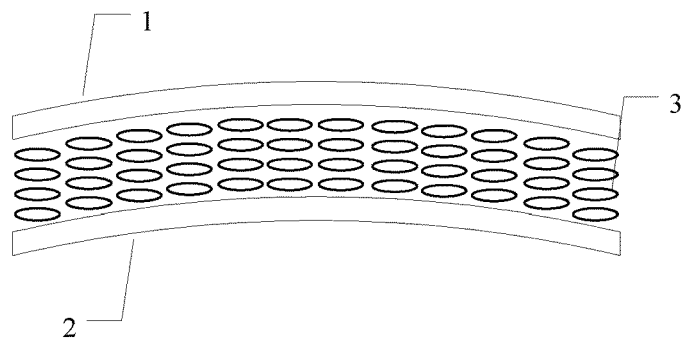
FIG. 1a and FIG. 1b are structural views of a curved surface LCD panel provided by the embodiment of present invention.

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not intended to define a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly To depress dark-state light leakage in a curved surface liquid crystal display (LCD) panel, the embodiment of present invention provides a curved surface LCD panel and a display device. The curved surface LCD panel comprises: an array substrate and an opposite substrate which are parallel with each other and curved towards a same direction; a liquid crystal (LC) layer located between the array substrate and the opposite substrate; and a plurality of optical retardation zones disposed at edge zones of the array substrate and the opposite substrate, respectively; each of the optical retardation zones on the array substrate is corresponding to one of the optical retardation zones on the opposite substrate, and every two corresponding optical retardation zones constitute a zone group; wherein the optical retardation zones in at least one zone group are attached with optical compensation films respectively, and each of the optical compensation films has an optical axis perpendicular to an optical axis of the optical retardation zone attached with the optical compensation film, and has an optical retardation amount equal, with an optical retardation amount of the optical retardation zone attached with the optical compensation film.

According to the embodiment of the present invention, the optical retardation zone refers to a zone on the array substrate or the opposite substrate where a variation in polarization characteristic of light may be occurred to generate an optical retardation and hence causes a dark-state light leakage. In the embodiment of present invention, the optical axis at a location of the optical retardation zone with a maximum optical retardation (that is, a location where the dark-state light leakage is most serious) is taken as the optical axis of this optical retardation zone.

According to the embodiment of the present invention, the optical compensation film is configured to counteract an optical effect of the optical retardation zone.

As stated above, in the embodiment of the present invention, optical compensation films are provided at optical retardation zones, which are disposed in opposite to each other, on the array substrate and the opposite substrate, respectively; moreover, each of the optical compensation films is configured to have an optical axis perpendicular to an optical axis of the optical retardation zone attached with the optical compensation film and has an optical retardation amount equal with an optical retardation amount of the optical retardation zone attached with the optical compensation film; in this way, an optical retardation generated in this optical retardation zone is counteracted; that is to say, an influence to the polarization characteristic of the LC layer resulting from the substrates can be eliminated, so as to depress the dark-state light leakage.

According to the embodiment of the present invention, in consideration of the fact that a curved surface LCD panel achieves the cured surface by shrinking one of the array substrate and the opposite substrate while stretching the other one, optical axes of the two substrates at a same optical retardation zone group are perpendicular to each other and have equal optical retardation amounts. Therefore, in one example, the optical retardation zones in each of the optical retardation zone group on the array substrate and the opposite substrate are respectively attached with optical compensation films of which optical axis are perpendicular to each other and optical retardation amounts are with each other.

According to the embodiment of the present invention, the optical compensation films can be disposed at various positions with respect to other film layers of the curved surface LCD panel. In one example, the curved surface LCD panel further comprises polarizer sheets respectively located at external sides of the array substrate and the opposite substrate; while the optical compensation films are located respectively between the array substrate and the polarizer sheet, and between the opposite substrate and the polarizer sheet.

According to the embodiment of the present invention, the optical compensation films can also be disposed at various positions on the array substrate and the opposite substrate. Hereinafter, detailed description will be given with reference to the case where the optical compensation films is attached on a rectangular, curved surface LCD panel, by way of example.

In one example, both of the array substrate and the opposite substrate are rectangular, and the optical retardation zones are distributed at four corners of the rectangular array substrate and opposite substrate, while the optical compensation films are attached on the optical retardation zone at any one of the corners of each substrate.

In one example, both of array substrate and the opposite substrate are rectangular, and the optical retardation zones are distributed at four corners of the rectangular array substrate and opposite substrate, while the optical compensation films are attached on two optical retardation zones at one of diagonal lines of each substrate.

In one example, both of the array substrate and the opposite substrate are rectangular, and the optical retardation zones are distributed at four corners of the rectangular array substrate and opposite substrate, while the optical compensation films are attached at four optical retardation zones at all of the four corners of each substrate.

Usually, the zones involving serious dark-state light leakage in a rectangular curved surface LCD panel are mainly distributed at the four corners of the panel. In the embodiment of the present invention, the optical retardation zones are attached with optical compensation films, thus the dark-state light leakage in the curved surface LCD panel is enormously depressed.

Additionally, the retardations at the four corners of each of the rectangular array substrate and opposite substrate are symmetric about a center of the substrate; that is to say, any two optical retardation zones arranged diagonally at the substrate have coincident optical axes and also equal optical retardation amounts. Therefore, in one example, the optical axes of the two optical compensation films attached at two optical retardation zones arranged diagonally have coincident directions. Only one direction can be compensated if only the two optical retardation zones at one diagonal line of the rectangular substrate is attached with optical compensation films, which is referred to as single-domain compensation; and both directions can be compensated if all the four optical retardation zones at both of the two diagonal lines of the rectangular substrate are attached with optical compensation films, which is referred to as double-domain compensation.

In some examples, an area of the optical compensation film is 1/10 to 1/4 of an area of the array substrate or the opposite substrate.

In some examples, the optical compensation film is attached in a corresponding optical retardation zone at an accuracy of 0 to 100 μm.

In some examples, a shape of the optical compensation film may be, but not limited to, rectangle.

To be specified, the curved surface LCD panel provided by the embodiment of the present invention may be, but not limited to, In Plane Switching (IPS) mode curved surface LCD panel or Advanced Super Dimension Switch (ADS) mode curved surface LCD panel.

Hereinafter, detailed description will be given with reference to particular application of the curved surface LCD panel provided by the embodiment of present invention by way of example.

Figure 1B:
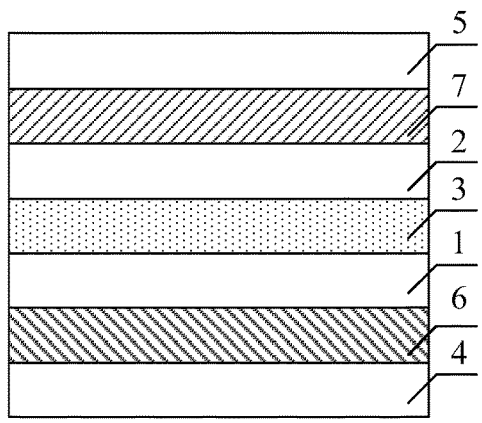

As illustrated in FIG. 1a and FIG. 1b, in this embodiment, an ADS mode curved surface LCD panel comprises: an array substrate 1; an opposite substrate 2; a LC layer 3 located between the array substrate 1 and the opposite substrate 2; a first polarizer sheet 4 disposed at an external side of the array substrate 1; a second polarizer sheet 5 disposed at an external side of the opposite substrate 2; a first optical compensation film 6 located between the array substrate 1 and the first polarizer sheet 4; and a second optical compensation film 7 located between the opposite substrate 2 and the second polarizer sheet 5.

In one example, each of the first polarizer sheet 4 and the second polarizer sheet 5 comprises a Triacetyl Cellulose (TAC) layer and a Polyvinyl Alcohol (PVA) layer. The first optical compensation film 6 and the second optical compensation film 7 are, respectively, attached at a side of the PVA layer close to the LC layer.

In one example, the edge zones of the array substrate 1 and the opposite substrate 2, respectively, are provided with four optical retardation zones at the four corners, and each of the four optical retardation zones on the array substrate 1 is disposed to be corresponding to and constitutes a zone group with one of the four optical retardation zones on the opposite substrate 2. In this example, given that planar centers of the array substrate 1 and of the opposite substrate 2 are considered as original points respectively, and given that extending directions of a longer side and a shorter side of the substrate are respectively considered as a horizontal axis and a longitudinal direction, total four quadrants can be divided. Counterclockwise, the four zone groups among the array substrate 1 and the opposite substrate 2 are respectively located at the first quadrant, the second quadrant, the third quadrant and the fourth quadrant. Accordingly, a first optical compensation film 6 and a second optical compensation film 7 can be attached at the optical retardation zones located at any one of the four quadrants on the array substrate 1 and the opposite substrate 2, respectively; alternatively, the first optical compensation film 6 and the second optical compensation film 7 can be attached at the optical retardation zones located in two quadrants which are disposed diagonally (e.g., the first quadrant and the third quadrant; or, the second quadrant and the fourth quadrant)on the array substrate 1 and the opposite substrate 2, respectively; alternatively, the first optical compensation film 6 and the second optical compensation film 7 can be attached at all the optical retardation zones located in all the four quadrants on the array substrate 1 and the opposite substrate 2, respectively. The area of the first or second optical compensation films 6, 7 is 1/10 to 1/4 of the area of the array substrate 1 or the opposite substrate 2. The first and second optical compensation film 6, 7 are respectively attached at the corresponding optical retardation zone at an accuracy of 0 to 100 μm.

In one example, the array substrate can be a Thin Film Transistor (TFT), while the opposite substrate can be a Color Filter (CF) substrate.

Hereinafter, the light leakage situation in the curved surface LCD panel attached with the optical compensation film provided by the embodiment of present invention will be compared with the light leakage situation in the existing curved surface LCD panel without the optical compensation film, to facilitate the understanding of the beneficial effect of the curved surface LCD panel provided by the embodiment of the present invention.

Figure 2:
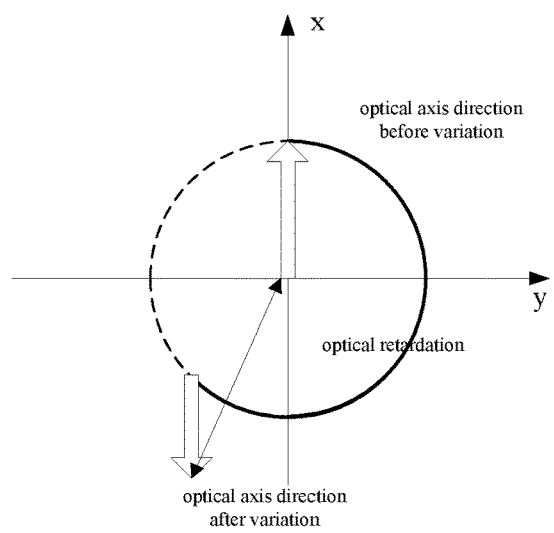
FIG. 2 is a schematic view of a poincare sphere.

I. Regarding the Existing Curved Surface LCD Panel without the Optical Compensation Film As can be seen from the poincare sphere illustrated in FIG. 2, the optical retardation generated by the array substrate 1 and the opposite substrate 2 causes the polarization characteristic of light to be varied and deviated from the absorption axis, resulting in light leakage; that is to say, the dark-state light leakage may be occurred if an optical axis at a location involving retardation on the substrate is not perpendicular to or identical with a direction of the polarizer sheet.

Figure 3A:
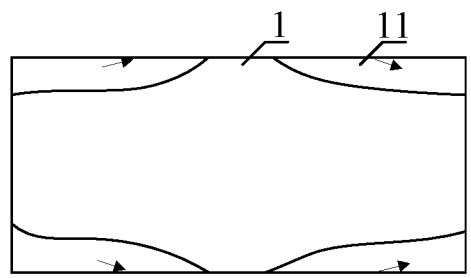
FIG. 3a is a schematic view illustrating a retardation situation at an optical retardation zone on an un-compensated, rectangular, array substrate.
Figure 3B:
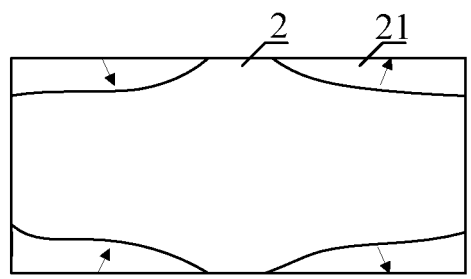
FIG. 3b is a schematic view illustrating a retardation situation at an optical retardation zone on an un-compensated, rectangular, opposite substrate.

As illustrated in FIG. 3a, in which a direction of arrow indicates a direction of optical axis, the direction of the optical axis at the location with maximal light leakage in the optical retardation zone 11 of the array substrate 1 is represented as −30°,30°, −30°, and 30° from the first quadrant to the fourth quadrant in this order, with a same optical retardation amount of 10 nm. As illustrated in FIG. 3b the direction of the optical axis at the location with maximal light leakage in the optical retardation zone 21 of the opposite substrate 2 is represented as 60°, −60°, 60°, and −60° from the first quadrant to the fourth quadrant in this order, with the same optical retardation amounts of 10 nm.

Figure 3C:
FIG. 3c is a schematic view illustrating a simulated light leakage of an un-compensated LCD panel.

As illustrated in FIG. 3c, different filling patterns are utilized to distinguish the severity of dark-state light leakage in each of the quadrants, which tells that, the location closer to the edge will involve severer dark-state light leakage; as a result, the simulated dark-state light leakage is 1.8%, that is, under a brightness of 400 nit, the light leakage at four sides of the substrate will reach 1.8%*400=7.2 nit.

II. Regarding the Curved Surface LCD Panel Provided by the Embodiment of Present Invention Attached with Optical Compensation Films Given that the second and fourth quadrants are compensated (i.e., under single-domain compensation) details are provided as below.

Figure 4A:
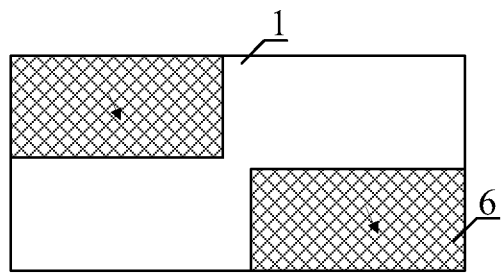
FIG. 4a is a first structural view of an optical compensation film attached at the optical retardation zone on the rectangular array substrate in the embodiment of the present invention.

As illustrated in FIG. 4a, the optical retardation zones located in the second and fourth quadrants on the array substrate 1 are each attached with a first optical compensation film 6 having a direction of optical axis of −60° and an optical retardation of 10 nm, so as to counteract the optical effect of the corresponding optical retardation zone.

Figure 4B:
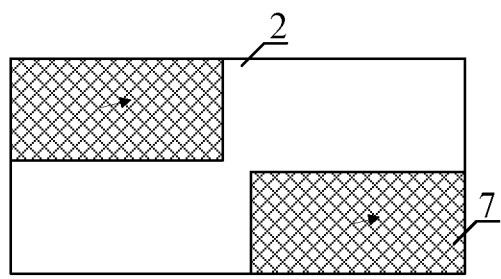
FIG. 4b is a first structural view of an optical compensation film attached at the optical retardation zone on the rectangular opposite substrate in the embodiment of the present invention.

As illustrated in FIG. 4b, the optical retardation zones located in the second and fourth quadrants on the opposite substrate 2 are each attached with a second optical compensation film 7 having a direction of optical axis of 30° and an optical retardation of 10 nm, so as to counteract the optical effect of the corresponding optical retardation zone.

Figure 4C:
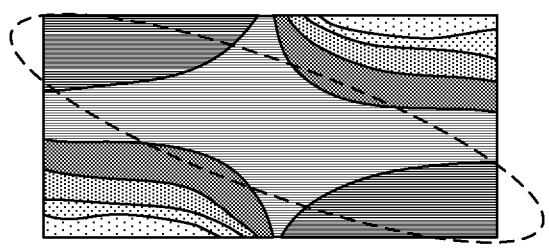
FIG. 4c is a first schematic view illustrating a simulated light leakage of the compensated LCD panel in the embodiment of present invention.

As illustrated in FIG. 4c, upon compensation at the locations with maximal light leakage in the second and fourth quadrants, the problem of light leakage is considerably depressed, for example, as illustrated by the dashed line in FIG. 4c, only a partial light leakage of 0.5% is existed.

Given that the first and third quadrants are compensated (i.e., under single-domain compensation), details are provided as below.

Figure 5A:
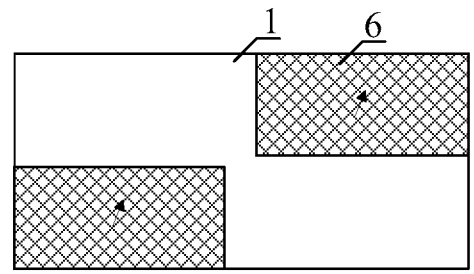
FIG. 5a is a second structural view of the optical compensation film attached at the optical retardation zone on the rectangular array substrate in the embodiment of present invention.

As illustrated in FIG. 5a, the optical retardation zones located in the first and third quadrants on the array substrate 1 are each attached with a first optical compensation film 6 having a direction of optical axis of 60° and an optical retardation of 10 nm, so as to counteract the optical effect of the corresponding optical retardation zone.

Figure 5B:
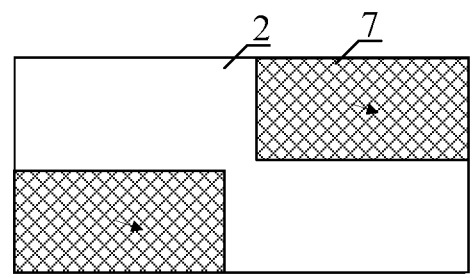
FIG. 5b is a second structural view of the optical compensation film attached at the optical retardation zone on the rectangular opposite substrate in the embodiment of present invention.

As illustrated in FIG. 5b, the optical retardation zones located in the first and third quadrants on the opposite substrate 2 are each attached with a second optical compensation film 7 having a direction of optical axis of −30° and an optical retardation of 10 nm, so as to counteract the optical effect of the corresponding optical retardation zone.

Figure 5C:
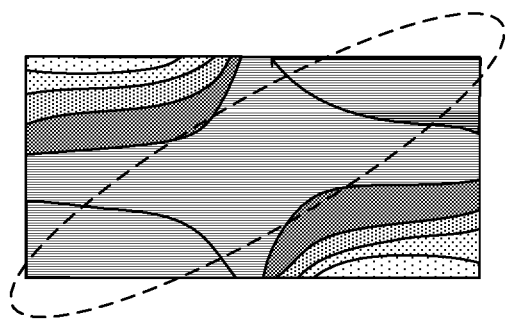
FIG. 5c is a second schematic view illustrating a simulated light leakage of the compensated LCD panel in the embodiment of present invention.

As illustrated in FIG. 5c, upon compensation at the locations with maximal light leakage in the first and third quadrants, the problem of light leakage is considerably depressed, for example, as illustrated by the dashed line in FIG. 5c, only a partial light leakage of 0.5% is existed.

Given that the first to the fourth quadrants are all compensated (i.e., under double-domain compensation), details are provided as below.

Figure 6A:
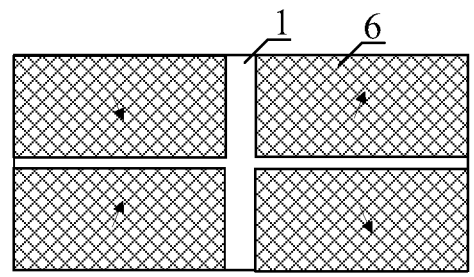
FIG. 6a is a third structural view of the optical compensation film attached at the optical retardation zone on the rectangular array substrate in the embodiment of present invention.

As illustrated in FIG. 6a, the optical retardation zones located in the first and third quadrants on the array substrate 1 are each attached with a first optical compensation film 6 having a direction of optical axis of 60° and an optical retardation of 10 nm; while the optical retardation zones located in the second and fourth quadrants are each attached with a first optical compensation film 6 having a direction of optical axis of −60° and an optical retardation of 10 nm, so as to counteract the optical effect of the corresponding optical retardation zone.

Figure 6B:
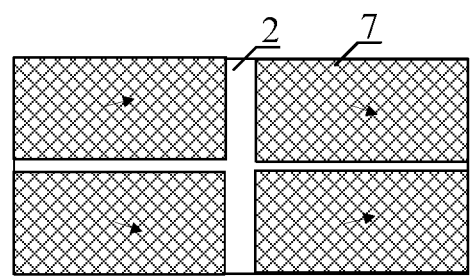
FIG. 6b is a third structural view of the optical compensation film attached at the optical retardation zone on the rectangular opposite substrate in the embodiment of present invention.

As illustrated in FIG. 6b, the optical retardation zones located in the first and third quadrants on the opposite substrate 2 are each attached with a second optical compensation film 7 having a direction of optical axis of −30° and an optical retardation of 10 nm; while the optical retardation zones located in the second and fourth quadrants on the opposite substrate 2 are each attached with a second optical compensation film 7 having a direction of optical axis of 30° and an optical retardation of 10 nm, so as to counteract the optical effect of the corresponding optical retardation zone.

Figure 6C:
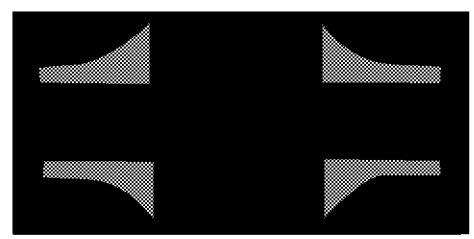
FIG. 6c is a third schematic view illustrating a simulated light leakage of the compensated LCD panel in the embodiment of present invention.

As illustrated in FIG. 6c, upon compensation, the locations with maximal light leakage in the first to the fourth quadrants only involve partial light leakage of 0.5%, that is, an overall improvement by 72° is obtained.

Based on the same inventive concept, the embodiment of present invention provides a display device comprising the curved surface LCD panel as described in any one of the above embodiments.

As stated above, in the curved surface LCD panel and the display device provided by the embodiment of present invention, optical compensation films are provided at optical retardation zones, opposite to each other, on the array substrate and the opposite substrate respectively; moreover, the optical compensation film is disposed to have an optical axis perpendicular to the optical axis of the optical retardation zone at which it's attached and have an optical retardation identical with the optical retardation of the optical retardation zone at which it's attached; in this way, the optical retardation generated in these zones can be counteracted, that is, the influence to the polarization characteristic of the LC layer from the substrate can be eliminated, and then the dark-state light leakage can be depressed.

The foregoing are merely specific embodiments of the invention, but not limitative to the protection scope of the invention. Within the technical scope disclosed by the present invention, any alternations or replacements which can be readily envisaged by one skilled in the art shall be within the protection scope of the present invention. Therefore, the protection scope of the invention shall be defined by the accompanying claims.

The present invention claims the benefits of Chinese patent application No. 201610179898.2, which was filed with the SIPO on Mar. 25, 2016 and is fully incorporated herein by reference as part of this application.

What is claimed is:

1. A curved surface liquid crystal display (LCD) panel, comprising:
    an array substrate and an opposite substrate being parallel with each other and being curved in a same direction, wherein edge zones of the array substrate and of the opposite substrate having plural optical retardation zones, each of the optical retardation zones on the array substrate being corresponding to one of the optical retardation zones on the opposite substrate, and two corresponding optical retardation zones constituting a zone group;
    a liquid crystal (LC) layer located between the array substrate and the opposite substrate; and
    an optical compensation film attached at each of the optical retardation zones in at least one zone group on the array substrate and the opposite substrate,
    the optical compensation film having an optical axis perpendicular to an optical axis of the optical retardation zone attached with the optical compensation film and having an optical retardation equal with an optical retardation of the optical retardation zone attached with the optical compensation film.

2. The curved surface LCD panel according to claim 1, wherein the optical compensation films respectively attached at the optical retardation zones in one zone group on the array substrate and the opposite substrate have their optical axes perpendicular to each other and have their optical retardations equal with each other.

3. The curved surface LCD panel according to claim 2, further comprising a polarizer sheet disposed at an external side of each of the array substrate and the opposite substrate, wherein the optical compensation films are, respectively, disposed between the array substrate and the polarizer sheet disposed at the external side of the array substrate, and between the opposite substrate and the polarizer sheet disposed at the external side of the opposite substrate.

4. The curved surface LCD panel according to claim 1, further comprising a polarizer sheet disposed at an external side of each of the array substrate and the opposite substrate, wherein the optical compensation films are, respectively, disposed between the array substrate and the polarizer sheet disposed at the external side of the array substrate, and between the opposite substrate and the polarizer sheet disposed at the external side of the opposite substrate.

5. The curved surface LCD panel according to claim 1, wherein
    both of the array substrate and the opposite substrate are rectangular-shaped; and the optical retardation zones are distributed at four corners of each of the array substrate and the opposite substrate.

6. The curved surface LCD panel according to claim 5, wherein
the optical compensation films are attached at the optical retardation zones at any one of the four corners of each of the array substrate and the opposite substrate.

7. The curved surface LCD panel according to claim 6, wherein an area of the optical compensation film is 1/10 to 1/4 of an area of the array substrate or the opposite substrate.

8. The curved surface LCD panel according to claim 6, wherein the optical compensation film is attached at the corresponding optical retardation zone at an accuracy of 0 to 100 μm.

9. The curved surface LCD panel according to claim 5, wherein
the optical compensation films are attached at the optical retardation zones at any two diagonal corners of the four corners of each of the array substrate and the opposite substrate.

10. The curved surface LCD panel according to claim 9, wherein the optical compensation films attached at the optical retardation zones at any two diagonal corners of each of the array substrate and the opposite substrate have their optical axes coincide with each other.

11. The curved surface LCD panel according to claim 9, wherein an area of the optical compensation film is 1/10 to 1/4 of an area of the array substrate or the opposite substrate.

12. The curved surface LCD panel according to claim 9, wherein the optical compensation film is attached at the corresponding optical retardation zone at an accuracy of 0 to 100 μm.

13. The curved surface LCD panel according to claim 5, wherein
the optical compensation films are attached at the optical retardation zones at all the four corners of each of the array substrate and the opposite substrate.

14. The curved surface LCD panel according to claim 13, wherein the optical compensation films attached at the optical retardation zones at any two diagonal corners of each of the array substrate and the opposite substrate have their optical axes coincide with each other.

15. The curved surface LCD panel according to claim 13, wherein an area of the optical compensation film is 1/10 to 1/4 of an area of the array substrate or the opposite substrate.

16. The curved surface LCD panel according to claim 13, wherein the optical compensation film is attached at the corresponding optical retardation zone at an accuracy of 0 to 100 μm.

17. A display device comprising the curved surface LCD panel according to claim 1.

\* \* \* \* \*